United States Patent
Daumling et al.

(10) Patent No.: US 9,141,450 B2
(45) Date of Patent: Sep. 22, 2015

(54) EMBEDDED APPLICATION COMMUNICATION

(75) Inventors: Michael Daumling, Adendorf (DE); Eric Berdahl, Morgan Hill, CA (US); James G. Sandman, Jr., Los Altos Hills, CA (US)

(73) Assignee: Adobe Systems Incorporated, San Jose, CA (US)

(*) Notice: Subject to any disclaimer, the term of this patent is extended or adjusted under 35 U.S.C. 154(b) by 907 days.

(21) Appl. No.: 12/547,431

(22) Filed: Aug. 25, 2009

(65) Prior Publication Data
US 2013/0167157 A1    Jun. 27, 2013

(51) Int. Cl.
*G06F 9/54* (2006.01)

(52) U.S. Cl.
CPC ................................. *G06F 9/548* (2013.01)

(58) Field of Classification Search
None
See application file for complete search history.

(56) References Cited

U.S. PATENT DOCUMENTS

| | | | |
|---|---|---|---|
| 5,734,380 A | 3/1998 | Adams et al. | |
| 5,922,044 A | 7/1999 | Banthia | |
| 6,052,528 A * | 4/2000 | Dechamboux | 717/116 |
| 6,063,128 A * | 5/2000 | Bentley et al. | 703/6 |
| 6,313,854 B1 | 11/2001 | Gibson | |
| 6,640,238 B1 * | 10/2003 | Bowman-Amuah | 709/201 |
| 6,658,419 B2 | 12/2003 | Pasquali | |
| 6,801,224 B1 | 10/2004 | Lewallen | |
| 6,864,905 B2 | 3/2005 | Meaden | |
| 7,213,213 B2 | 5/2007 | Sekiguchi et al. | |
| 7,316,010 B1 * | 1/2008 | Daynes et al. | 717/140 |
| 7,325,204 B2 | 1/2008 | Rogers | |
| 7,971,194 B1 * | 6/2011 | Gilboa | 717/136 |
| 2001/0044856 A1 * | 11/2001 | Agesen et al. | 709/315 |
| 2003/0033443 A1 | 2/2003 | Igotti | |
| 2003/0191870 A1 * | 10/2003 | Duggan | 709/331 |
| 2004/0093587 A1 * | 5/2004 | Sesma | 717/118 |
| 2005/0102670 A1 * | 5/2005 | Bretl et al. | 718/1 |
| 2005/0188384 A1 * | 8/2005 | Yogaratnam et al. | 719/331 |
| 2006/0005187 A1 | 1/2006 | Neil | |
| 2006/0020914 A1 * | 1/2006 | Arthurs et al. | 717/106 |
| 2006/0230105 A1 | 10/2006 | Shappir et al. | |
| 2008/0295022 A1 | 11/2008 | Valdes et al. | |
| 2009/0234804 A1 * | 9/2009 | Whitechapel et al. | 707/3 |
| 2009/0234876 A1 * | 9/2009 | Schigel et al. | 707/102 |

OTHER PUBLICATIONS

Sheriff, Paul D., "Variable and Method Scope in Microsoft.NET," MSDN, Dec. 2001.*
"Visual Basic for Applications," Wikipedia, en.wikipedia.org/wiki/Visual_Basic_for_Applications, Dec. 21, 2008.*

(Continued)

*Primary Examiner* — Shih-Wei Kraft
(74) *Attorney, Agent, or Firm* — Wolfe-SBMC

(57) ABSTRACT

Methods, systems, and apparatus, including computer programs encoded on a computer storage medium, for embedded application communication. In one aspect, a method includes providing a first Application Programming Interface (API) in the host application, where the first API is configured to interact with a virtual machine object model of the virtual machine to allow the host application to set and get properties of one or more first class instances residing in a virtual machine memory space, and to invoke methods on the first class instances, and providing a second API in the virtual machine configured to interact with a host application object model in the host application.

13 Claims, 5 Drawing Sheets

(56) References Cited

OTHER PUBLICATIONS

"Visual Studio Tools for Office," Wikipedia.org, Apr. 6, 2008, http://en.wikipedia.org/wiki/Visual_Studio_Tools_for_Office, 2 pages.*
Adobe Introduction to Scripting, Adobe Systems Incorporated, 2007, 52 pages.
Wikipedia—SpiderMonkey (JavaScript engine) [online], (retrieved on Aug. 26, 2009). Retrieved from the Internet: <URL: http://en.wikipedia.org/w/index.php?title=SpiderMonkey_(JavaScript_engine)&printable=yes>, 2 pages.
Kirschner "Using (Native) Windows with AIR", dated Mar. 18, 2008, downloaded from the internet at http://pegolon.wordpress.com/2008/03/18/using-nativewindows-with-air/ on Aug. 12, 2011, 7 pages.
Wikipedia, "ActionScript", dated Mar. 26, 2010, downloaded from the internet at http://web.archive.org/web/20100326032416/http://en.wikipedia.org/wiki/ActionScript on Aug. 12, 2011, 8 pages.
Wikipedia, "Flash Player", dated May 26, 2008, downloaded from the internet at http://web.archive.org/web/20080528054248/http://en.wikipedia.org/wiki/Flash_Player on Aug. 12, 2011, 4 pages.
Wikipedia, "Web Browser", dated May 21, 2008, downloaded from the internet at http://web.archive.org/web/20080528040344/http://en.wikipedia.org/wiki/Web_browser on Aug. 12, 2011, 3 pages.

* cited by examiner

EMBEDDED APPLICATION COMMUNICATION

BACKGROUND

Object-oriented programming (OOP) is a programming paradigm that uses "objects"—data structures comprising properties and methods—and their interactions to design applications and computer programs. Programming techniques may include features such as information hiding, data abstraction, encapsulation, modularity, polymorphism, and inheritance. An object-oriented program or application may be viewed as a collection of cooperating objects wherein each object is capable of receiving messages, processing data, and sending messages to other objects.

SUMMARY

In general, one aspect of the subject matter described in this specification can be embodied in a method that includes a method for providing a first Application Programming Interface (API) in the host application, the host application, where the first API is configured to interact with a virtual machine object model of the virtual machine to allow the host application to set and get properties of one or more first class instances residing in a virtual machine memory space, and to invoke methods on the first class instances; providing a second API in the virtual machine configured to interact with a host application object model in the host application to allow the virtual machine to set and get properties of one or more second class instances residing in a different host application memory space, and to invoke methods on the second class instances; and wherein the first and second APIs do not alter the format of data retrieved from the host and virtual machine application memory spaces. Other embodiments of this aspect include corresponding systems, apparatus, and computer program products.

These and other embodiments can optionally include one or more of the following features. The first API and the second API can be each configured to provide access to a respective name space that encompasses class names in the virtual machine model and the host object model, respectively. An object model can specify how class instances are stored in a memory space and semantic properties of the class instances. The application object model can be different from the virtual machine object model. The first API and the second API can be configured to create class instances in the virtual machine and the host application, respectively, corresponding to class instances in the virtual machine and host application, respectively. The created class instance has a same class name as a corresponding class. The first API can be used to invoke a method on a class instance in the virtual machine from the host application or using the second API to invoke a method on a class instance in the host application from the virtual machine. The first API can be further configured to allow the host application to control the lifespan of a class instance in the virtual machine. The second API can be further configured to allow the virtual machine to send events to the host application and wherein the first API is further configured to allow the host application to receive events from the virtual machine.

In general, another aspect of the subject matter described in this specification can be embodied in a system comprising a computer-readable storage device including a computer program product; one or more processors configured to interact with the storage device and execute the program product to perform operations comprising: providing a first Application Programming Interface (API) in the host application, the host application, where the first API is configured to interact with a virtual machine object model of the virtual machine to allow the host application to set and get properties of one or more first class instances residing in a virtual machine memory space, and to invoke methods on the first class instances; providing a second API in the virtual machine configured to interact with a host application object model in the host application to allow the virtual machine to set and get properties of one or more second class instances residing in a different host application memory space, and to invoke methods on the second class instances; and wherein the first and second APIs do not alter the format of data retrieved from the host and virtual machine application memory spaces. Other embodiments of this aspect include corresponding systems, apparatus, and computer program products.

These and other embodiments can optionally include one or more of the following features. The first API and the second API can be each configured to provide access to a respective name space that encompasses class names in the virtual machine model and the host object model, respectively. An object model can specify how class instances are stored in a memory space and semantic properties of the class instances. The application object model can be different from the virtual machine object model. The first API and the second API can be configured to create class instances in the virtual machine and the host application, respectively, corresponding to class instances in the virtual machine and host application, respectively. The first API can be used to invoke a method on a class instance in the virtual machine from the host application or using the second API to invoke a method on a class instance in the host application from the virtual machine. The first API can be further configured to allow the host application to control the lifespan of a class instance in the virtual machine.

In general, another aspect of the subject matter described in this specification can be embodied in a computer program product, encoded on a computer-readable storage device, operable to cause data processing apparatus to perform operations comprising: providing a first Application Programming Interface (API) in the host application, the host application, where the first API is configured to interact with a virtual machine object model of the virtual machine to allow the host application to set and get properties of one or more first class instances residing in a virtual machine memory space, and to invoke methods on the first class instances; providing a second API in the virtual machine configured to interact with a host application object model in the host application to allow the virtual machine to set and get properties of one or more second class instances residing in a different host application memory space, and to invoke methods on the second class instances; and wherein the first API and the second API are configured to create class instances in the virtual machine and the host application, respectively, corresponding to class instances in the virtual machine and host application, respectively. Other embodiments of this aspect include corresponding systems, apparatus, and computer program products.

These and other embodiments can optionally include one or more of the following features. The first API and the second API can be each configured to provide access to a respective name space that encompasses class names in the virtual machine model and the host object model, respectively. The application object model can be different from the virtual machine object model. The first API can be used to invoke a method on a class instance in the virtual machine from the host application or using the second API to invoke a method on a class instance in the host application from the virtual machine. The second API can be further configured to allow the virtual machine to send events to the host application and wherein the first API is further configured to allow the host application to receive events from the virtual machine.

Particular embodiments of the subject matter described in this specification can be implemented so as to realize one or more of the following advantages. Host and embedded applications can create and access objects in the other, including invoking methods on the objects. Events raised in the embedded application can be caught by the host application, and vice versa. Data in a virtual machine memory space or a host application memory space has a format that does not change when the data is transferred between the host application and the virtual machine which allows for fast data transfers.

The host application and embedded application can each implement code that accesses functionality on "the other side of the fence" as if that functionality were natively written on "their own side of the fence." Although host and embedded applications easily access functionality in each other, they do so without entangling data or object lifetimes between themselves. That is, the lifetime of a host object and its associated embedded object are explicitly not linked to one another. As such, a host object can be deleted before, after, or at the same time as the associated embedded object. The host application determines which effect it wants on an object-by-object basis by the way it chooses to implement the callbacks listed later in the document. Lifetime independence, makes it significantly simpler for the host application and embedded application to work together because each side usually has very different models of object lifetime, and neither side is forced to use the lifetime model of the other and may, instead, use the lifetime model most convenient to itself.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
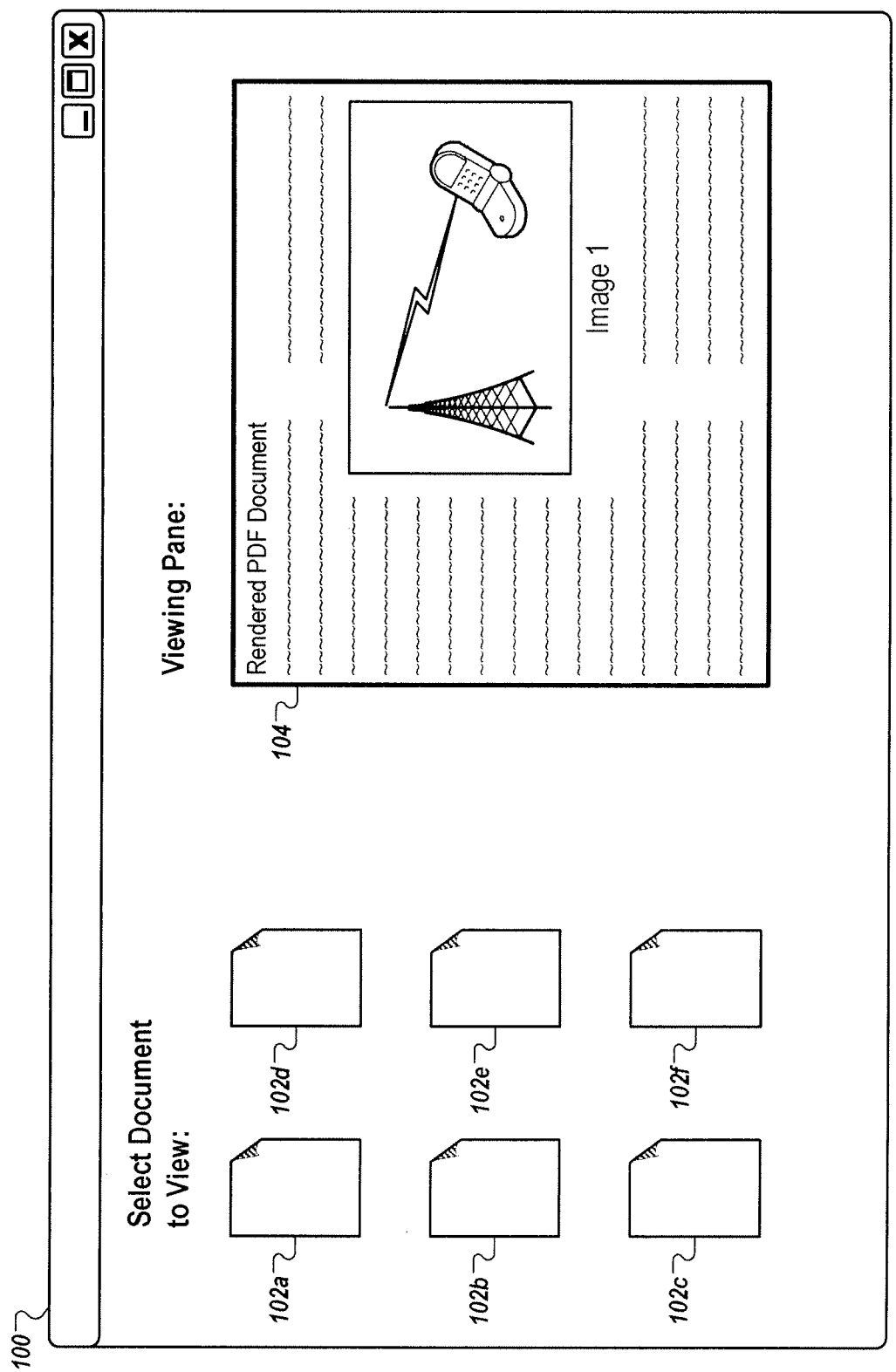
FIG. 1 illustrates a graphic user interface for an example host application with an embedded virtual machine.

In various implementations, a host application includes an embedded application that is configured to execute within the host application. FIG. 1 illustrates a graphic user interface (GUI) 100 for an example host application having an embedded application that is, in this example, a virtual machine. The GUI 100 represents the host application's primary GUI window that includes a viewing pane 104 which is an area of the primary GUI window that is used by the embedded application for displaying documents. There are other ways for a host and an embedded application to share the GUI 100, and one or both may not require a GUI. By way of illustration, an embedded application can execute as one or more threads within the process space of the host application. Other techniques for embedding an application are possible.

Generally speaking, an application is a computer program such as, for instance, a web browser or a word processor. An application includes data and instructions which are processed by a computing device in order to implement the application's functionality. An application can execute atop an operating system or it can execute directly on the underlying hardware of a computing device. By way of further illustration, an application such as a virtual machine can be capable of processing data and instructions of another application. An example of a virtual machine is the Adobe Flash Player (available from Adobe Systems Incorporated of San Jose, Calif.). The Flash Player can execute computer programs written in the ActionScript programming language.

Returning to FIG. 1, the example host application is a Portable Document Format (PDF) document viewer written in the C++ programming language that renders PDF documents for viewing. For example, user selection of the icon 102a representing a PDF document will cause a corresponding document to be rendered in the viewing pane 104 of the embedded application. The embedded application in this example is an ActionScript virtual machine that itself executes a program that is capable of rendering PDF documents on behalf of the host application.

The host application can reference data in the embedded application, and vice versa. In various implementations, the referenced data can be application variables, memory addresses, metadata, instantiated classes (or "objects"), or class data, for example. Other types of data are possible. In this illustration, the embedded application can reference a PDF document in order to render the document on behalf of the host application. For example, the PDF document represented by icon 102a can be a document stored in the host application's memory as a C++ object. The embedded application can reference the host application's C++ object by creating an ActionScript object in the embedded application's memory that is associated with the host application's object. Function or method invocations made by the embedded application on the embedded application object are routed to the host application's object. Data that is returned by the host object's method invocation are passed from the host application to the embedded application. In this way, data stored in the host application objects can be accessed by the embedded application.

Similarly, the host application can access data in the embedded application. For example, when a PDF document is presented in the viewing pane 104, the host application can bookmark the location that was last displayed in the document. When that document is later shown in the viewing pane 104, it can be opened to the bookmarked position. For example, the embedded application can include an ActionScript object that represents the current page in the document that is being displayed. Before the host application loads a new document, the host application instantiates a C++ object that references the embedded application's ActionScript object. The host application can invoke a method on the host application object to retrieve the current page property from the embedded application's ActionScript object. The request is routed to the embedded application's object, and current page number is returned to the host application.

While the example host and embedded applications in FIG. 1 are illustrated having GUIs, they need not. Either the host or the embedded application, or both, can be a virtual machine. In further implementations, neither the host nor the embedded application are virtual machines.

Figure 2:
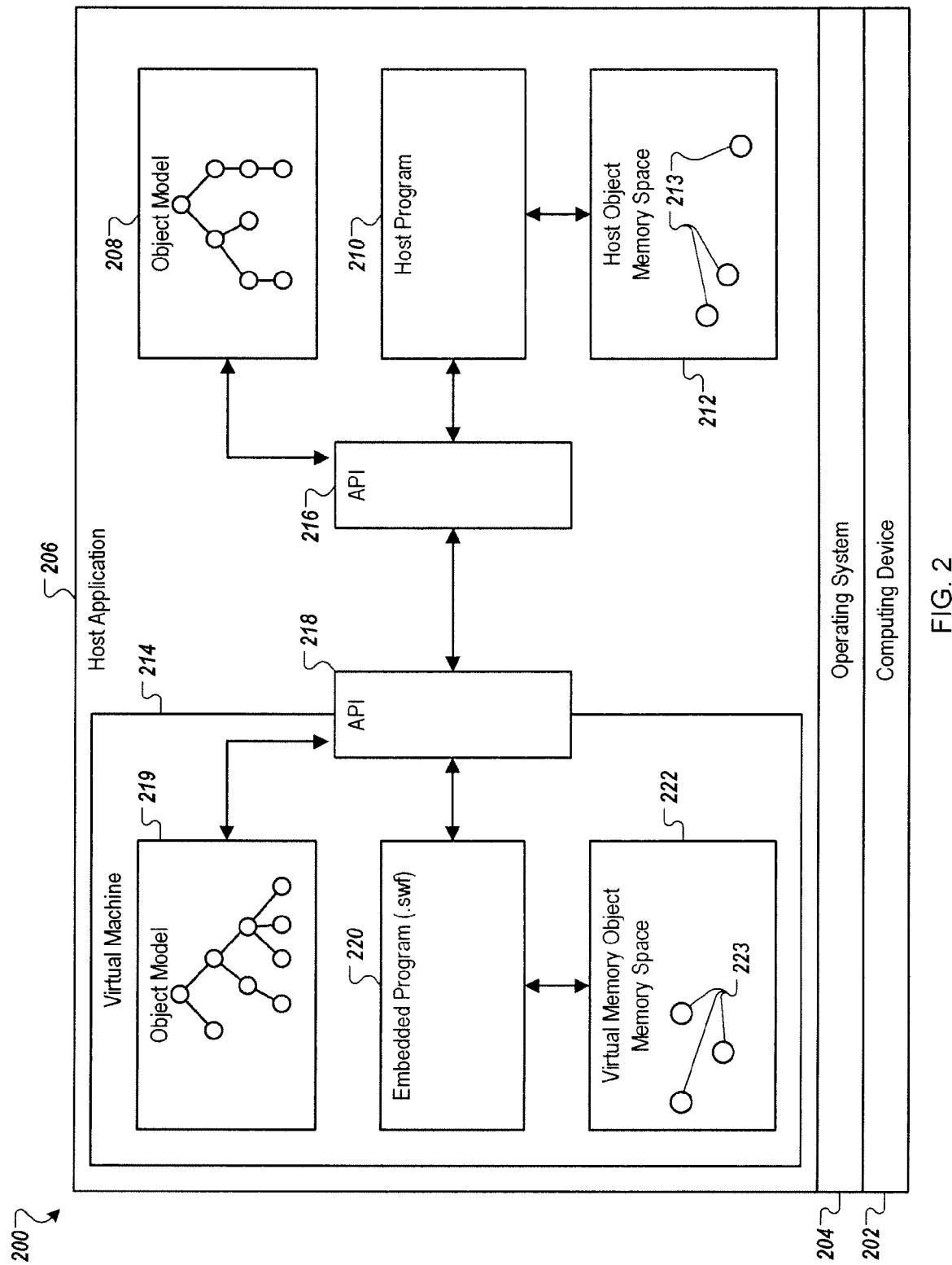
FIG. 2 illustrates a block diagram of an example computer system that includes a host application with an embedded virtual machine.

FIG. 2 illustrates a block diagram of an example computer system 200 that includes a host application with an embedded virtual machine 214. In various implementations, the computer system 200 includes a computing device 202, which can execute an operating system 204. The computing device 202 can comprise computer hardware and software as are more fully described later in this document. The operating system 204 comprises software that is able to manage and coordinate executing computer applications and system resources on the computing device 202. The host application 206 is a software application or program that executes on the computing device 202. By way of illustration, the computing device 202 can be a mobile phone, the operating system 104 can be the phone's operating system, and the host application 206 can be a web browser. By way of further illustration, the computing device 202 can be a personal laptop, the operating system 204 can be the operating system running on the laptop, and the host application 206 can be a word processing application.

The host application 206 includes an object model 208. Generally speaking, for a specific programming language, an object model defines compile-time and run-time behaviors for classes and objects such as, for example, inheritance, object instantiation, data hiding, data abstraction, method invocation, polymorphism, encapsulation, and the storage format of objects in memory (e.g., host object memory space 212). An object model can be enforced at compile-time, run-time or both. At run-time an object model can include data and instructions that are invoked to implement the various behaviors.

By way of illustration, a base class for all geometric shapes can be defined according to a C++ object model 208 for the host application 206. Specific shapes can be created as subclasses of the shape base class. For example, a rectangle can be defined as a shape with two pairs of straight, parallel edges of the same length, for instance. A square can be defined as a rectangle where all four sides are the same length. In this way, a class hierarchy can be defined according to the object model 208 of the host application's programming language.

The host object memory space 212 comprises one or more sections of memory allocated for use by the host program 210. The host program 210 represents instructions that when executed by the computing device 202 implement functionality of the host application 206. The host object memory space 212 is used for storing objects for use by the host program 210. For example, objects 213 in memory space 212 represent three objects used by the host program 210.

The embedded application 214 (e.g., an ActionScript program executing in an ActionScript virtual machine) contains instructions 220 that when executed perform operations that can access the host application's object model 208 or memory space 212 by way of the API 216. In order to expose its object model 208 to the embedded application 214, the host application 206 registers a number of callback functions or methods in its API 216. The embedded application 214 uses these functions to access properties of, or create objects in, the host application memory space 212, or to invoke methods on objects in the host object memory space 212. In some implementations, the callback functions are those described in TABLE 1. Other callback functions are possible, however. A similar set of functions can be made available to the host application to access the object model 219 and memory space 222 of the embedded application 214.

TABLE 1

| FUNCTION | DESCRIPTION |
| --- | --- |
| GetRootCallback | This callback returns the root object for the host application 206. The root object provides access to properties, methods and classes in the object model 208 and objects 213 in memory space 212. By way of illustration, a root object would, for example, provide access to the host application 206's document or window objects (e.g., 102a, 104, 100).<br>Return value:<br>Memory address of root object |
| GetClassObjectCallBack | This callback retrieves an object in the host application's object model 208 to access static properties and methods of a class.<br>Argument:<br>Class path (see below)<br>Return value:<br>A class object |
| CreateCallback | The embedded program 220 invokes this callback with a class path and constructor arguments to instantiate a host application 206 object in memory space 212. In some implementations, the callback returns an opaque reference to the memory object in host memory space 212 which implements the constructed object.<br>Arguments:<br>Class path (see below)<br>Constructor arguments<br>Return value:<br>Memory address of the instantiated class object |
| GetClassNameCallback | This callback retrieves the class name of an object in the host application memory space 212. The returned class name may either be a partially or fully qualified class path.<br>Argument:<br>Memory address of the object<br>Return value:<br>Class path of the object (see below) |

TABLE 1-continued

| FUNCTION | DESCRIPTION |
| --- | --- |
| DisconnectCallback | The embedded application 214 can invoke this callback when an object in the embedded application 214's memory space 222 associated with the a host application 206 object is garbage collected, deleted or otherwise becomes disconnected from the host application 206 object. The host application 206 is free to react in any way; it could decrement a reference count for the host object, delete the host object, or keep the host object for later reuse, for instance.<br>Argument:<br>Memory address of the object |
| GetPropertyFlagsCallback | This callback returns a set of property flags (e.g., read-only property, a read-write property, a callable method, or a combination of a property and a method) for an object in memory space 212.<br>Arguments:<br>Memory address of the object<br>Property name<br>Return value:<br>A set of property flags |
| GetPropertyCallback | This callback retrieves the value of an object property. The arguments to the callback include a reference to the host application 206 object and the name of the object's property.<br>Arguments:<br>Memory address of the object<br>Property name<br>Return value:<br>Value of the property |
| SetPropertyCallback | This callback stores the value of an object property. The arguments to the callback include a reference to the host application 206 object, the name of the host object's property, and a new value for the property.<br>Arguments:<br>Memory address of the object<br>Property name<br>Value of the property |
| InvokeMethodCallback | This callback invokes a method on a host application 206 object. The arguments to the callback include a reference to the host application 206 object, the name of the method to invoke, and method arguments, if any. If the method has return value(s), the return values are supplied in an array.<br>Arguments:<br>Memory address of the object<br>Method name<br>Method arguments (if any)<br>Return value:<br>Method return values (if any) |

Generally speaking, atoms are containers for data entities (e.g., function parameters and return values) that flow back and forth between the host application 206 and the embedded application 214 through the API's 216 and 218. In various implementations, an atom is represented as a 32-bit or 64-bit value. This value is large enough to contain either a pointer (e.g., a memory reference to an object or other data in memory space 212 or 222), an integer, or a floating point value. Examples of atom types are listed in TABLE 2. Other atom types are possible. In some implementations, for the callbacks in TABLE 1, references to objects in memory space 212 and 222 are opaque void* pointers. These pointers can be passed between the objects in the host application 206 and the embedded application 214 as atoms without having to be de-referenced. In various implementations, storing data from a memory space (e.g., 222 or 212) in atoms does not result in the data changing its format. This allows for fast data transfers between the host and embedded applications because marshaling and de-marshaling (or encoding and decoding) of data is not performed by either API (218 and 216).

TABLE 2

| ATOM | DESCRIPTION |
| --- | --- |
| String | An ordered collection of characters. |
| Boolean | True or False data. |
| Integer | A signed integer. |
| Double | Floating point value. |
| Special | Undefined, Null, or other special case values. |

The embedded application 214 also includes an object model 219 which can be the same or similar to object model 208, or entirely different. The embedded application memory space 222 comprises one or more sections of memory allocated for use by the embedded application 214. The embedded program 220 represents instructions that when executed by the computing device 202 implement functionality of the embedded application 214. The memory space 222 is used for storing objects (e.g., 223) for use by the embedded program 220.

The host application 206 contains instructions 210 that when executed perform operations that can access the embedded application's object model 219 or memory space 222. In order to expose its object model 219 to the host application 206, the embedded application 214 registers a number of functions or methods in its API 218. The host application 206 uses these functions to access properties of, or create objects in, the embedded application memory space 222, or to invoke methods on objects in the embedded application memory space 222. In some implementations, the functions are those described in TABLE 3. Other callback functions are possible, however.

TABLE 3

| FUNCTION | DESCRIPTION |
| --- | --- |
| GetRoot | This function returns the root object for the embedded application 214. The root object provides access to properties, methods and classes in the object model 219 and objects 223 in memory space 222. If the embedded application is a Flash virtual machine, for instance, the root object can be the Flash Player instance.<br>Return value:<br>Memory address of a root object |
| GetClassObject | This function retrieves an object in the embedded application's object model 219 to access static properties and methods of a class.<br>Argument:<br>Class path (see below)<br>Return value:<br>A class object |
| ObjectCreate | This function is invoked with a class path and constructor arguments to instantiate an embedded application 214 object in memory space 222. In some implementations, the callback returns an opaque reference to the memory object in host memory space 222 which implements the constructed object.<br>Arguments:<br>Class path (see below)<br>Constructor arguments<br>Return value:<br>Memory address of the instantiated class object |
| GetClassName | This function retrieves the class name of an object in the embedded application memory space 222. The returned class name may a partial or fully qualified class path.<br>Argument:<br>Memory address of the object<br>Return value:<br>Class path (see below) |
| Lock | This function locks or unlocks an object in the embedded application memory space 222 to prevent or permit garbage collection or deletion.<br>Argument:<br>Memory address of the object |
| GetPropertyFlags | This function returns a set of property flags (e.g., read-only property, a read-write property, a callable method, or a combination of a property and a method) for an object in memory space 222.<br>Arguments:<br>Memory address of the object<br>Property name<br>Return value:<br>A set of property flags |
| GetProperty | This function retrieves the value of a property. The arguments to the function include a reference an object in memory space 222 and the name of the object's property.<br>Arguments:<br>Memory address of the object<br>Property name<br>Return value:<br>Property value |
| PutProperty | This function stores the value of a property. The arguments to the function include a reference to the object in memory space 222, the name of the host object's property, and a new value for the property.<br>Arguments:<br>Memory address of the object<br>Property value |
| DeleteProperty | This function deletes a value or method of an embedded application 214 object.<br>Arguments:<br>Memory address of the object<br>Property name<br>Return value:<br>Boolean value indicating success or failure |

TABLE 3-continued

| FUNCTION | DESCRIPTION |
|---|---|
| InvokeMethod | This function invokes a method on an embedded application 214 object. The arguments to the function include a reference to the embedded application 214 object, the name of the method to invoke, and method arguments (as atoms), if any. If the method has return value(s), the return values are supplied in an array of atoms. InvokeMethod takes as arguments a reference to the object and a property name.<br>Arguments:<br>Memory address of the object<br>Method name<br>Method arguments<br>Return value:<br>Method return values (if any) |
| AddEventListener | This function registers a host application 206 event listener for events generated by an embedded application 214 object. Particular event types can be specified (e.g., object creation, object deletion, exception). Events are described in further detail below. Events generated by the object are provided to the host application 206 event listener for further processing by the host application 206.<br>Arguments:<br>Memory address of the object<br>Event type |
| RemoveEventListener | This function removes a previously registered host application event listener.<br>Arguments:<br>Memory address of the object<br>Event type |
| Enumerate | This function is called once or repeatedly to enumerate the contents of an object in memory space 222.<br>Arguments:<br>Memory address of the object<br>Property identifier<br>Return value:<br>Property identifier of the next property |

In some implementations, the embedded application 214's objects can dispatch event messages when they perform an action, change state, or are otherwise manipulated. These events can be captured by host application listeners that register with the object (AddEventListener) and listen for events. Listeners can listen for a particular type of event, or for any type of event. For example, an embedded application 214 object that represents a document can dispatch a "saved" or "closed" event. A host application 206 object that is a file manager may register a listener specifying the "saved" event. When the embedded application 214 object dispatches a "saved" event, the host application listener performs an action such as updating a use log. When the "closed" event is dispatched, the listener will ignore the event, as it is not the type specified.

Exception creation is a mechanism to respond to the execution of a program that indicates an error, an invalid action, or an unexpected event. For example, when a program attempts to read a file from disk that is not there, a FileNotFound exception can be created. This exception can be handled in a number of different ways, such as by alerting the user, selecting a file that does exist, or delaying for a time and attempting to read the file again later.

Exceptions created in the host application 206 can be transmitted to the embedded application 214, and vice versa. For example, if the embedded application 214 calls the InvokeMethodCallback function on a host application 206 object with a parameter that causes an exception in the host application 206, the host application 206 can return a value from the method indicating to the embedded application 214 that an exception occurred. Similarly, if the host application 206 calls the InvokeMethod function on an embedded application 214 object with a parameter that causes an exception in the embedded application 214, the embedded application 214 can return a value from the method indicating to the host application 206 that an exception occurred.

Figure 3:
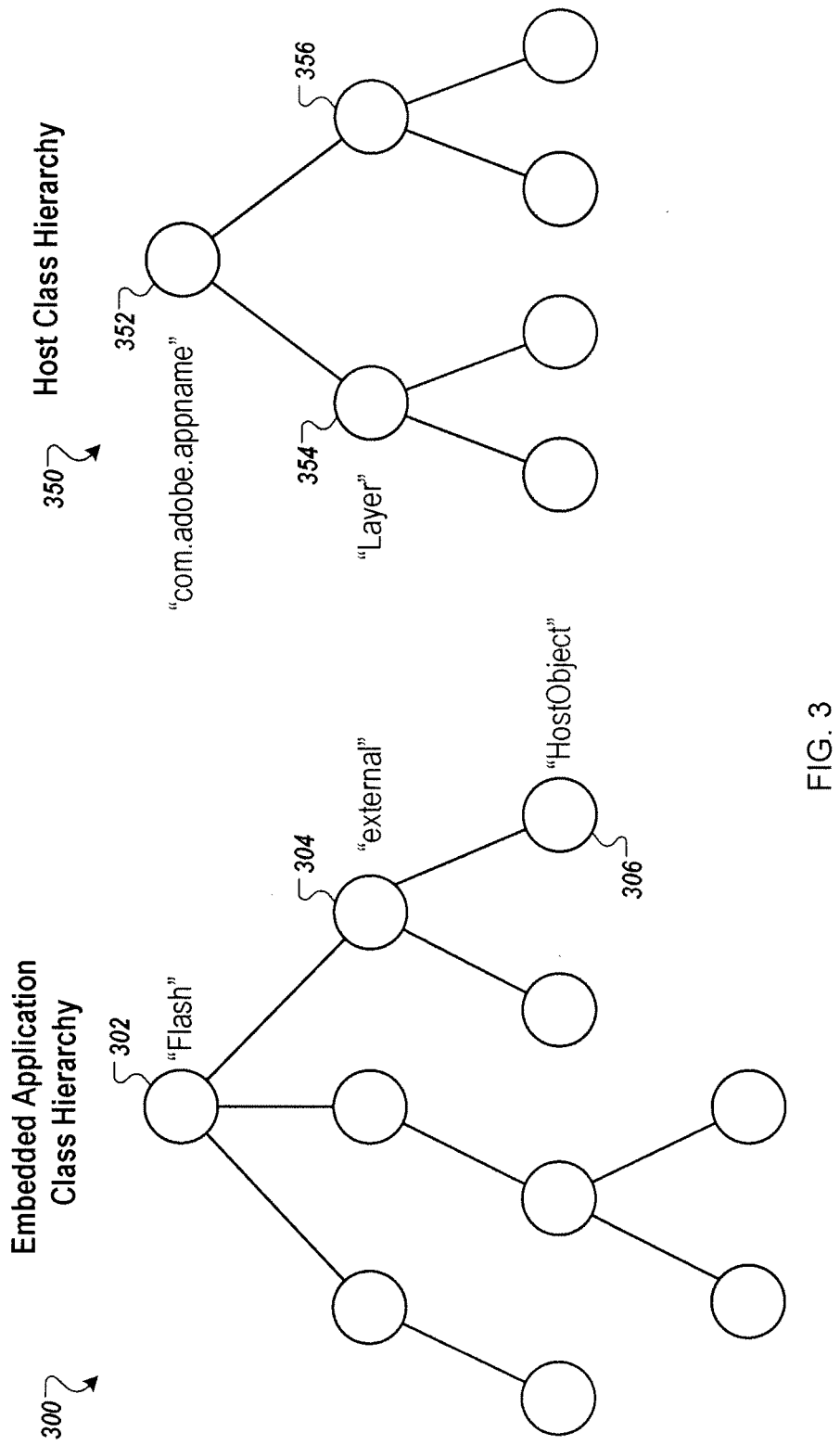
FIG. 3 illustrates example class hierarchies of a host and of an embedded application.

FIG. 3 illustrates class hierarchies of a host and embedded application. The embedded application 214 example class hierarchy 300 is represented by the object model 219 of the embedded application 214. The root class 302 of the class hierarchy 300 is named the "Flash" class. The "external" class 304 is a child or subclass of the "Flash" class 302 and, as such, inherits properties and methods of its parent class 304 according to the object model 219. Likewise, the "HostObject" class 306 is a child or subclass of the "external" class 304. Accordingly, the "HostObject" class 306 inherits methods and properties of its parent classes (i.e., 304, 302) as dictated by the object model 219. In some implementations, a class is identified by a string representing a class path starting at the root of the class hierarchy and ending with the class in question. For example, the class path of the root class 302 is "Flash", the class path of the "external" class 304 is "Flash.external", and the class path of the "HostObject" class 306 is "Flash.external.HostObject". A class path can be fully qualified i.e., the path includes every class in the chain of inheritance, or the class path can be partially qualified such that the path includes only a single class name without other class names in the chain of inheritance.

Each API (218 and 216) allows access to the class name space (the set of all class paths) of the embedded application 214 or the host application 206, respectively, for the creation and manipulation of class objects in that name space. API 216 allows the embedded application to have access to the class name space of the host application 206 and, likewise, API 218 allows the host application to have access to the class name space of the embedded application 214. In some implementations, the class name spaces are maintained in the object model (219, 208) of the respective application.

By way of illustration, in some implementations the GetClassName function described above in TABLE 3 in reference to API 218 returns class paths of classes in the embedded application 214's object model 222 to the host application 206. Also in reference to API 218, the Get Root function returns an object that is instantiated from the root class of the class trie, such as the "Flash" class in this example. The root object can be used by the embedded application 214 or the host application 206 in order to traverse the class hierarchy 302 and discover the properties and methods of its classes.

The host application 206 example class hierarchy 350 is represented by the object model 208 of the host application 206. The root class 352 of the class hierarchy 350 is named the "com.adobe.appname" class. The "Layer" class 354 or 356 is a child or subclass of the "com.adobe.appname" class 352 and, as such, inherits properties and methods of the parent class 352 according to the object model 208. In some implementations, a class is identified by a fully or partially qualified class path, as described above.

By way of illustration, in some implementations the GetClassNameCallabck function described above in TABLE 2 in reference to API 216 returns class paths of classes in the host application 206's object model 208 to the embedded application 214. Also in reference to API 216, the Get RootCallback function returns an object that is instantiated from the root class 352 of the class hierarchy 350, such as the "com.adobe.appname" class in this example. The root object can be used by the host application 206 or the embedded application 214 in order to traverse the class hierarchy 350 and discover the properties and methods of its classes.

Figure 4:
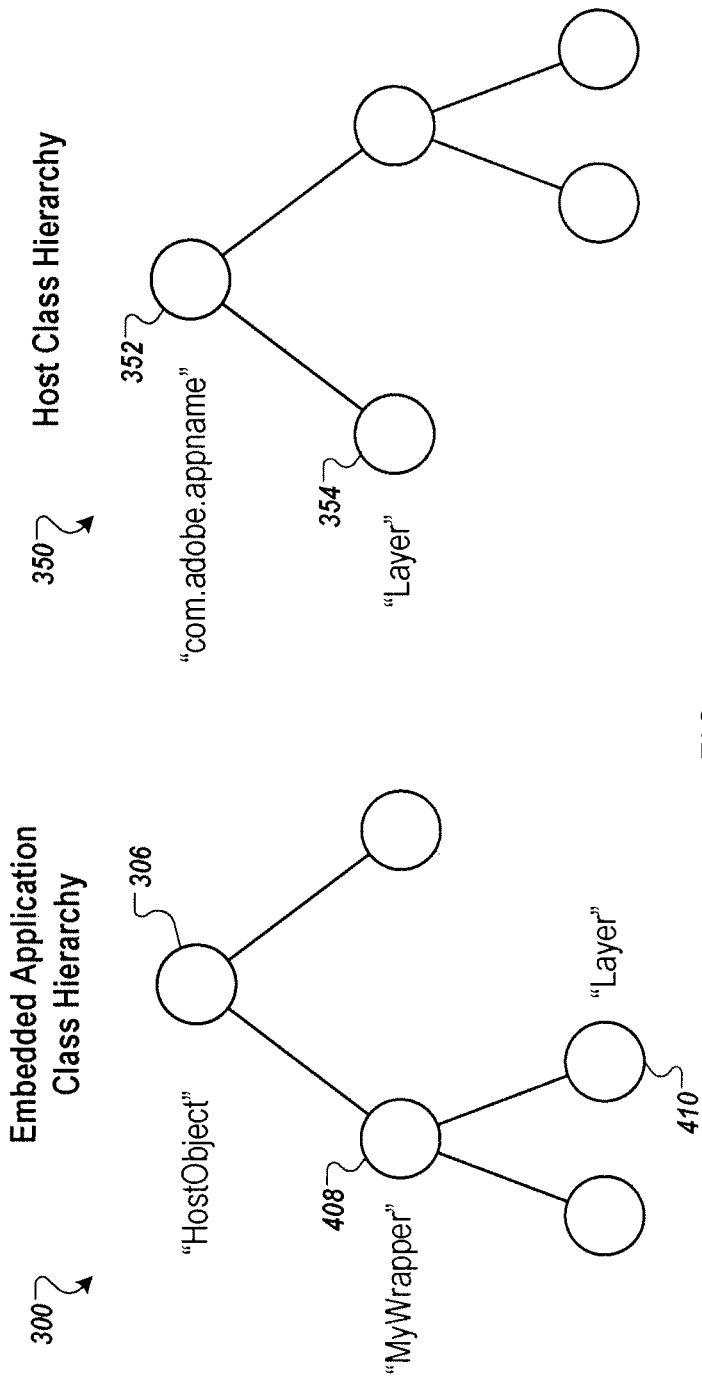
FIG. 4 illustrates automatic down-casting of an object.

FIG. 4 illustrates automatic down-casting of an object. In some implementations, instantiated objects of the "HostObject" class 306 are used by the embedded application 214 to wrap references to objects in the host application 206's memory space 212 and provide a simpler way for the embedded application 214 to access the API 216. When a callback function in the host application 206's API 216 returns a memory address for an object in the object memory 212 the address is cast to a HostObject object pointer. In some implementations, the HostObject object pointer is then automatically downcast to a subclass of the HostObject class having the same or similar name as the class name of the host object class. By way of illustration, an object in the memory space 212 of the Layer class 408 would be automatically downcast to a pointer to the Layer class 410 because their names are the same. The host application 206 can also wrap references to objects in the embedded application 214's memory space 222 and perform automatic downcasting of memory references to embedded application 214 objects to host application 206 objects.

Figure 5:
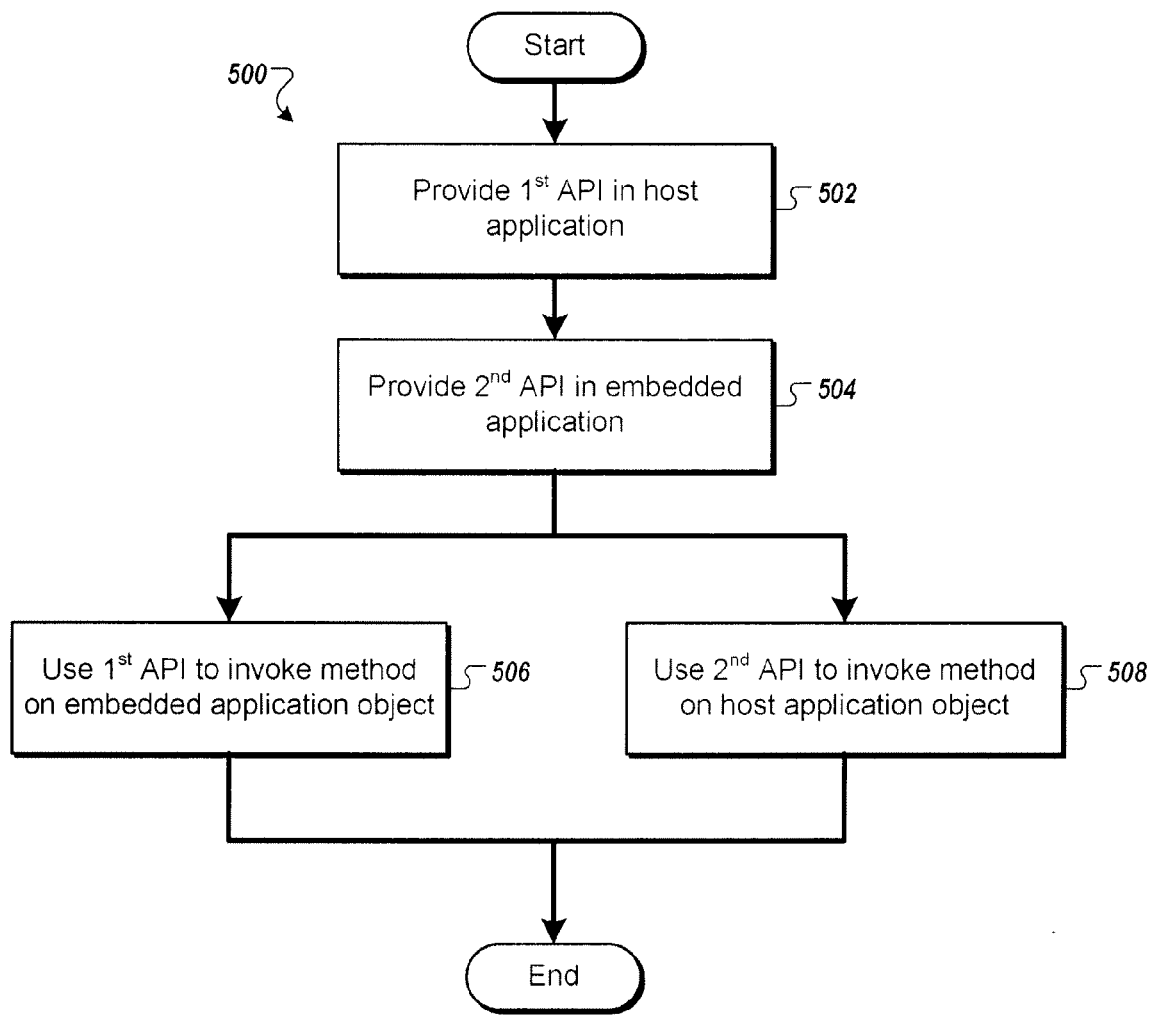
FIG. 5 is a flow chart of an example technique for communication between a host application and a virtual machine configured to execute within the host application.

FIG. 5 is a flow chart of an example technique 500 for communication between a host application, such as the host application 206, and an embedded application, such as embedded application 214. In step 502, an API (e.g., 218) is provided to the host application which provides access for the host application to the object model (e.g., 219) and memory space (e.g., 222) of the embedded application. In step 504, an API (e.g., 216) is provided to the embedded application which provides access for the embedded application to the object model (e.g., 208) and memory space (e.g., 212) of the host application. In step 506, the host application uses the API (e.g., 218) provided to it in order to invoke a method on an embedded application object in memory space 222. In step 508, the embedded application uses the API (e.g., 216) provided to it in order to invoke a method on a host application object in memory space 212.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, a personal computer system, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or in general any type of computing or electronic device or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

An electronic document (which for brevity will simply be referred to as a document) can, but need not, correspond to a file. A document can be stored in a portion of a file that holds other documents, in a single file dedicated to the document in question, or in multiple coordinated files.

While this specification contains many specific implementation details, these should not be construed as limitations on the scope of any inventions or of what can be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

What is claimed is:

1. A computer-implemented method comprising:
    exposing, by a processor, a host application object model to a program embedded in a virtual machine embedded in a host application by registering callback functions or methods in a first Application Programming Interface (API), wherein the first API is configured to provide access to a name space that encompasses class names in the host application object model, and the callback functions or methods registered in the first API allowing the embedded program to:
        create one or more class instances in a host application memory space, the class instances being objects;
        set and get properties of a first class instance that resides in the host application memory space; and
        invoke methods on the first class instance;
    exposing, by the processor, a virtual machine object model, which is associated with the embedded program and different from the host application object model, to the host application by registering functions or methods in a second API, wherein the second API is configured to provide access to a name space that encompasses class names in the virtual machine object model, and the functions or methods registered in the second API allowing the host application to:
        create one or more class instances in a virtual machine memory space, the class instances being objects;
        set and get properties of a second class instance residing in the virtual machine memory space; and
        invoke methods on the second class instance with a pointer reference;
    using, by the processor, different models of object lifetime for the host application and the embedded program such that a lifetime of a host object and an embedded object associated with the host object are not linked;
    transferring, by the processor, data between the host application and the embedded program through the first and second APIs, the first and second APIs not performing encoding or decoding of the data;
    using the second API to invoke a method on a class instance in the virtual machine from the host application or using the first API to invoke a method on a class instance in the host application from the virtual machine; and
    the callback functions registered in the first API and the functions registered in the second API using pointer references to objects, and the pointer references are passed as atoms between objects used by the host application and the embedded program, without being de-referenced.

2. The computer-implemented method of claim 1 wherein an object model specifies how class instances are stored in a memory space and semantic properties of the class instances.

3. The computer-implemented method of claim 1 wherein creating an object in the virtual memory space comprises downcasting a pointer for an object in the host application memory space to a subclass in the virtual machine object model having a same class name as a corresponding class of the object in the host application memory space.

4. The computer-implemented method of claim 1 wherein the second API is further configured to allow the host application to control a lifespan of a class instance in the virtual machine.

5. The computer-implemented of claim 1 wherein the first API is further configured to allow the virtual machine to send events to the host application and wherein the second API is further configured to allow the host application to receive events from the virtual machine.

6. A system comprising:
    a computer-readable storage device including a computer program product;
    one or more processors configured to interact with the storage device and execute the program product to perform operations comprising:
        exposing a host application object model to a program embedded in a virtual machine embedded in a host application by registering callback functions or methods in a first Application Programming Interface (API), wherein the first API is configured to provide access to a name space that encompasses class names in the host application object model, and the callback functions or methods registered in the first API allowing the embedded program to:
            create class instances in a host application memory space, the class instances being objects;
            set and get properties of a first class instance that resides in the host application memory space; and
            invoke methods on the first class instance;
        exposing a virtual machine object model, which is associated with the embedded program and different from the host application object model, to the host application by registering functions or methods in a second API, wherein the second API is configured to provide access to a name space that encompasses class names in the virtual machine object model, and the functions or methods registered in the second API allowing the host application to:
            create one or more class instances in a virtual machine memory space, the class instances being objects;
            set and get properties of a second class instance residing in the virtual machine memory space; and
            invoke methods on the second class instance with a pointer reference;
        using different models of object lifetime for the host application and the embedded program such that a lifetime of a host object and an embedded object associated with the host object are not linked;
        transferring data between the host application and the embedded program through the first and second APIs, the first and second APIs not performing encoding or decoding of the data;
        using the second API to invoke a method on a class instance in the virtual machine from the host application or using the first API to invoke a method on a class instance in the host application from the virtual machine; and
        the callback functions registered in the first API and the functions registered in the second API using pointer references to objects, and the pointer references are passed as atoms between objects used by the host application and the embedded program, without being de-referenced.

7. The system of claim 6 wherein an object model specifies how class instances are stored in a memory space and semantic properties of the class instances.

8. The system of claim 6, wherein the functions or methods registered in the second API allows the host application to further perform operations comprising:
    instantiating an object in the host application memory space that references an associated object in the virtual machine memory space; and
    invoking a method on the object in the host application memory space to retrieve a property from the associated object in the virtual machine memory space; and wherein the callback functions or methods registered in the first API allows the embedded program to further perform operations comprising:
instantiating an object in the virtual machine memory space that references an associated object in the host application memory space; and
invoking a method on the object in the virtual machine memory space to retrieve a property from the associated object in the host application memory space.

9. The system of claim 8, wherein creating an object in the virtual memory space comprises downcasting a pointer for an object in the host application memory space to a subclass in the virtual machine object model having a same class name as a corresponding class of the object in the host application memory space.

10. The system of claim 6 wherein the second API is further configured to allow the host application to control a lifespan of a class instance in the virtual machine.

11. A non-transitory computer-readable storage device encoding a computer program product that causes data processing apparatus to perform operations comprising:
exposing, by a processor, a host application object model to a program embedded in a virtual machine embedded in a host application by registering callback functions or methods in a first Application Programming Interface (API), wherein the first API is configured to provide access to a name space that encompasses class names in the host application object model, and the callback functions or methods registered in the first API allowing the embedded program to:
create class instances in a host application memory space, the class instances being objects;
set and get properties of a first class instance that resides in the host application memory space; and
invoke methods on the first class instance;
retrieve an object from the host application memory space comprising:
using a pointer reference to the object; and
passing, without de-referencing, the pointer reference between the embedded program and the host application memory space;
exposing, by the processor, a virtual machine object model, which is associated with the embedded program and different from the host application object model, to the host application by registering functions or methods in a second API, wherein the second API is configured to provide access to a name space that encompasses class names in the virtual machine object model, and the functions or methods registered in the second API allowing the host application to:
create one or more class instances in a virtual machine memory space, the class instances being objects;
set and get properties of a second class instance residing in the virtual machine memory space; and
invoke methods on the second class instance with a pointer reference; and
retrieve an object from the virtual machine memory space comprising:
using a pointer reference to the object; and
passing, without de-referencing, the pointer reference between the host application and the virtual machine memory space;
using, by the processor, different models of object lifetime for the host application and the embedded program such that a lifetime of a host object and an embedded object associated with the host object are not linked;
transferring, by the processor, data between the host application and the embedded program through the first and second APIs, the first and second APIs not performing encoding or decoding of the data;
using the second API to invoke a method on a class instance in the virtual machine from the host application or using the first API to invoke a method on a class instance in the host application from the virtual machine; and
the callback functions registered in the first API and the functions registered in the second API using pointer references to objects, and the pointer references are passed as atoms between objects used by the host application and the embedded program, without being de-referenced.

12. The non-transitory computer-readable storage device of claim 11, wherein the functions or methods registered in the second API allows the host application to further perform operations comprising:
instantiating an object in the host application memory space that references an associated object in the virtual machine memory space; and
invoking a method on the object in the host application memory space to retrieve a property from the associated object in the virtual machine memory space; and
wherein the callback functions or methods registered in the first API allows the embedded program to further perform operations comprising:
instantiating an object in the virtual machine memory space that references an associated object in the host application memory space; and
invoking a method on the object in the virtual machine memory space to retrieve a property from the associated object in the host application memory space.

13. The non-transitory computer-readable storage device of claim 12, wherein creating an object in the virtual memory space comprises downcasting a pointer for an object in the host application memory space to a subclass in the virtual machine object model having a same class name as a corresponding class of the object in the host application memory space.

* * * * *

UNITED STATES PATENT AND TRADEMARK OFFICE
CERTIFICATE OF CORRECTION

PATENT NO. : 9,141,450 B2  
APPLICATION NO. : 12/547431  
DATED : September 22, 2015  
INVENTOR(S) : Daumling et al.

Page 1 of 1

It is certified that error appears in the above-identified patent and that said Letters Patent is hereby corrected as shown below:

In the Claims

Column 17, line 63, after "computer-implemented", insert -- method --, therefor.

Column 18, line 43, after "encoding", delete "or", insert -- and --, therefor.

Column 19, line 54, after "space;", delete "and", therefor.

Column 20, line 16, after "encoding", delete "or", insert -- and --, therefor.

Signed and Sealed this  
Eighth Day of March, 2016

Michelle K. Lee  
*Director of the United States Patent and Trademark Office*